US009430705B2

(12) United States Patent
Ochi et al.

(10) Patent No.: US 9,430,705 B2
(45) Date of Patent: Aug. 30, 2016

(54) INFORMATION PROCESSING APPARATUS, INFORMATION PROCESSING METHOD, INFORMATION PROCESSING SYSTEM, AND PROGRAM

(75) Inventors: Takayuki Ochi, Kanagawa (JP); Kazuhiro Nakagomi, Tokyo (JP); Yorimitsu Naito, Saitama (JP); Takamasa Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 396 days.

(21) Appl. No.: 13/470,625

(22) Filed: May 14, 2012

(65) Prior Publication Data

US 2012/0314915 A1     Dec. 13, 2012

(30) Foreign Application Priority Data

Jun. 13, 2011   (JP) ................. 2011-130963

(51) Int. Cl.
*G06K 9/00* (2006.01)
(52) U.S. Cl.
CPC .. *G06K 9/00677* (2013.01); *G06K 2009/00328* (2013.01)
(58) Field of Classification Search
USPC ................................ 382/118, 225
See application file for complete search history.

(56) References Cited

U.S. PATENT DOCUMENTS

| 7,286,723 B2* | 10/2007 | Taugher et al. ............ 382/305 |
| 8,611,678 B2* | 12/2013 | Hanson et al. ............ 382/225 |
| 2004/0145602 A1* | 7/2004 | Sun et al. ............... 345/720 |
| 2006/0061598 A1* | 3/2006 | Mino et al. .............. 345/629 |
| 2006/0078201 A1* | 4/2006 | Kim ................. G06F 17/30256 382/181 |
| 2006/0245624 A1* | 11/2006 | Gallagher et al. .......... 382/118 |
| 2006/0251339 A1* | 11/2006 | Gokturk ............ G06F 17/30253 382/305 |
| 2007/0195344 A1* | 8/2007 | Mochizuki et al. .......... 358/1.9 |
| 2007/0216709 A1* | 9/2007 | Kojima et al. ............ 345/619 |
| 2007/0216773 A1* | 9/2007 | Kojima et al. ............ 348/207.1 |
| 2010/0074540 A1* | 3/2010 | Tang et al. .............. 382/225 |
| 2010/0156834 A1* | 6/2010 | Sangster .................. 345/173 |
| 2010/0226584 A1* | 9/2010 | Weng et al. .............. 382/225 |
| 2010/0238191 A1* | 9/2010 | Lee ................... G06K 9/00221 345/589 |
| 2010/0271395 A1* | 10/2010 | Isogai et al. ............ 345/635 |
| 2011/0007975 A1* | 1/2011 | Kazama et al. ........... 382/225 |
| 2011/0085710 A1* | 4/2011 | Perlmutter et al. ......... 382/118 |
| 2011/0211736 A1* | 9/2011 | Krupka et al. ........... 382/118 |
| 2011/0235858 A1* | 9/2011 | Hanson et al. ........... 382/103 |
| 2011/0249904 A1* | 10/2011 | Mochizuki et al. ......... 382/225 |
| 2011/0293188 A1* | 12/2011 | Zhang et al. ............. 382/190 |
| 2012/0303610 A1* | 11/2012 | Zhang .................... 707/722 |
| 2012/0308087 A1* | 12/2012 | Chao et al. .............. 382/115 |
| 2012/0314915 A1* | 12/2012 | Ochi et al. .............. 382/118 |

(Continued)

FOREIGN PATENT DOCUMENTS

JP      2010-16796       1/2010

OTHER PUBLICATIONS

U.S. Appl. No. 13/837,894, Mar. 15, 2013, Ochi, et al.

*Primary Examiner* — Aaron W Carter
(74) *Attorney, Agent, or Firm* — Chip Law Group

(57) ABSTRACT

There is provided an information processing apparatus including a face image acquisition section which acquires face images extracted from images which are classified into an identical time cluster by performing time clustering, and a person information generation section which classifies the face images for each time cluster, and generates person information in which persons regarded as an identical person are identified based on the face images which are classified.

13 Claims, 22 Drawing Sheets

(56) References Cited

U.S. PATENT DOCUMENTS

2012/0328190 A1* 12/2012 Bercovich et al. ........... 382/165
2013/0215144 A1* 8/2013 Anzai et al. .................. 345/619
2013/0250181 A1* 9/2013 Zhang et al. ................. 348/734
2013/0342708 A1* 12/2013 Chou et al. ................ 348/207.1

* cited by examiner

FIG. 4

| IMAGE FILE | METADATA | | |
|---|---|---|---|
| | TITLE | CAPTURING DATE/TIME | ··· |
| DSC101.jpg | aaaaa | 2011/6/1 14:26 | ··· |
| DSC102.jpg | aaabb | 2011/6/1 14:27 | ··· |
| DSC103.jpg | aabbb | 2011/6/1 14:30 | ··· |
| DSC104.jpg | babbb | 2011/6/1 14:33 | ··· |
| DSC105.jpg | bbabb | 2011/12/3 11:55 | ··· |
| ⋮ | ⋮ | ⋮ | ⋮ |

FIG. 5

| FACE THUMBNAIL | EXTRACTING SOURCE CONTENT |
|---|---|
| 001.jpg | DSC101.jpg |
| 002.jpg | DSC102.jpg |
| 003.jpg | DSC103.jpg |
| 004.jpg | DSC101.jpg |
| 005.jpg | DSC105.jpg |
| ⋮ | ⋮ |

FIG. 6

| FACE CLUSTER ID | FACE THUMBNAIL |
|---|---|
| FC001 | 001.jpg |
|  | 002.jpg |
|  | 003.jpg |
| FC002 | 004.jpg |
|  | 005.jpg |
| FC003 | 009.jpg |
|  | 010.jpg |
| ⋮ | ⋮ |

FIG. 7

| FACE THUMBNAIL | AGE | SEX | DEGREE OF BABYNESS | DEGREE OF ADULTNESS | DEGREE OF AGEDNESS |
|---|---|---|---|---|---|
| 001.jpg | 20 | 0.81 | 0.1 | 0.86 | 0.28 |
| 002.jpg | 20 | 0.76 | 0.08 | 0.79 | 0.22 |
| 003.jpg | 20 | 0.32 | 0.05 | 0.90 | 0.8 |
| 004.jpg | 20 | 0.11 | 0.44 | 0.79 | 0.31 |
| 005.jpg | 20 | 0.23 | 0.51 | 0.81 | 0.29 |
| ⋮ | ⋮ | ⋮ | ⋮ | ⋮ | ⋮ |

FIG. 8

| FEATURE QUANTITY (ATTRIBUTE) | AVAILABLE VALUE | MEANING |
|---|---|---|
| AGE | 0-90 | REPRESENT AGE IN 10-YEAR BLOCKS |
| SEX | 0.0-1.0 | REPRESENT SEX<br>CLOSER TO 0.0: FEMALE<br>CLOSER TO 1.0: MALE |
| DEGREE OF BABYNESS | 0.0-1.0 | REPRESENT CERTAINTY FACTOR INDICATING WHETHER PERSON IS BABY<br>CLOSER TO 1.0: BABY<br>CLOSER TO 0.0: NON-BABY |
| DEGREE OF ADULTNESS | 0.0-1.0 | REPRESENT CERTAINTY FACTOR INDICATING WHETHER PERSON IS ADULT<br>CLOSER TO 1.0: ADULT<br>CLOSER TO 0.0: NON-ADULT |
| DEGREE OF AGEDNESS | 0.0-1.0 | REPRESENT CERTAINTY FACTOR INDICATING WHETHER PERSON IS AGED PERSON<br>CLOSER TO 1.0: AGED PERSON<br>CLOSER TO 0.0: NON-AGED PERSON |

| TIME CLUSTER ID | IMAGE FILE |
|---|---|
| TC001 | DSC101.jpg |
|  | DSC102.jpg |
|  | DSC103.jpg |
|  | DSC104.jpg |
| TC002 | DSC105.jpg |
|  | ⋮ |

FIG. 11

| FACE CLUSTER ID | FACE THUMBNAIL |
|---|---|
| FC001 | 001.jpg |
|  | 002.jpg |
| FC002 | 004.jpg |
|  | 005.jpg |
| FC003 | 009.jpg |
|  | 010.jpg |
| ⋮ | ⋮ |

FIG. 12

| FACE CLUSTER ID | AGE | SEX | DEGREE OF BABYNESS | DEGREE OF ADULTNESS | DEGREE OF AGEDNESS |
|---|---|---|---|---|---|
| FC001 | 20 | 0.79 | 0.09 | 0.83 | 0.25 |
| FC002 | 20 | 0.17 | 0.48 | 0.8 | 0.30 |
| ⋮ | ⋮ | ⋮ | ⋮ | ⋮ | ⋮ |

FIG. 15

| FACE CLUSTER ID | FACE THUMBNAIL |
|---|---|
| FC001 | 001.jpg |
|  | 002.jpg |
|  | 009.jpg |
|  | 010.jpg |
| FC002 | 004.jpg |
|  | 005.jpg |
| ⋮ | ⋮ |

FIG. 18

| TIME CLUSTER ID | GROUP ID | FACE CLUSTER ID |
|---|---|---|
| TC001 | G001 | FC001 |
| | | FC002 |
| | | FC009 |
| TC001 | G002 | FC004 |
| | | FC005 |
| ⋮ | ⋮ | ⋮ |

| TIME CLUSTER ID | GROUP ID | FACE CLUSTER ID |
|---|---|---|
| TC002 | G011 | FC001 |
| | | FC002 |
| | | FC009 |
| | | FC011 |
| TC002 | G012 | FC004 |
| | | FC005 |
| ⋮ | ⋮ | ⋮ |

FIG. 21

| TIME CLUSTER ID | GROUP ID | FACE CLUSTER ID |
|---|---|---|
| TC001 | GP001 | FC001 |
| | | FC002 |
| | | FC009 |
| TC002 | GP001 | FC001 |
| | | FC002 |
| | | FC009 |
| | | FC011 |
| TC001 | GP002 | FC004 |
| | | FC005 |
| TC002 | GP002 | FC004 |
| | | FC005 |
| ⋮ | ⋮ | ⋮ |

FIG. 22
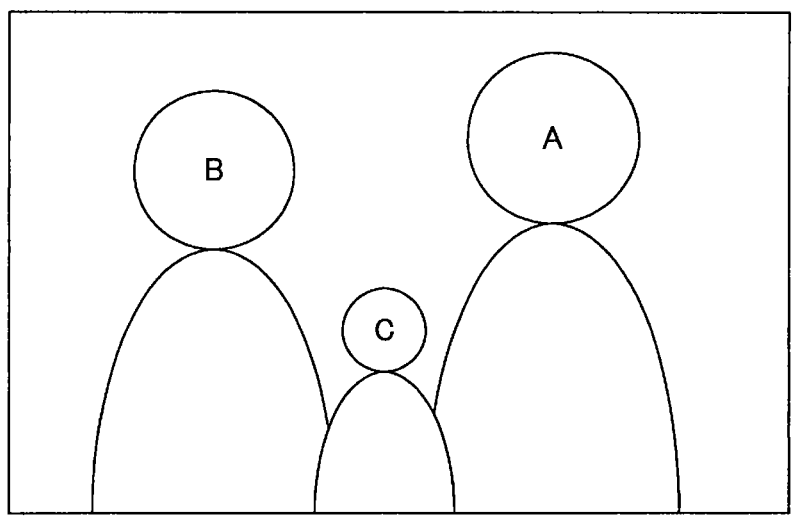
A: MALE, ADULT
B: FEMALE, ADULT
C: MALE, CHILD
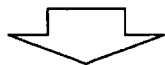
FAMILY GROUP
A-B: HUSBAND/WIFE
A-C, B-C: PARENT/CHILD

FIG. 23
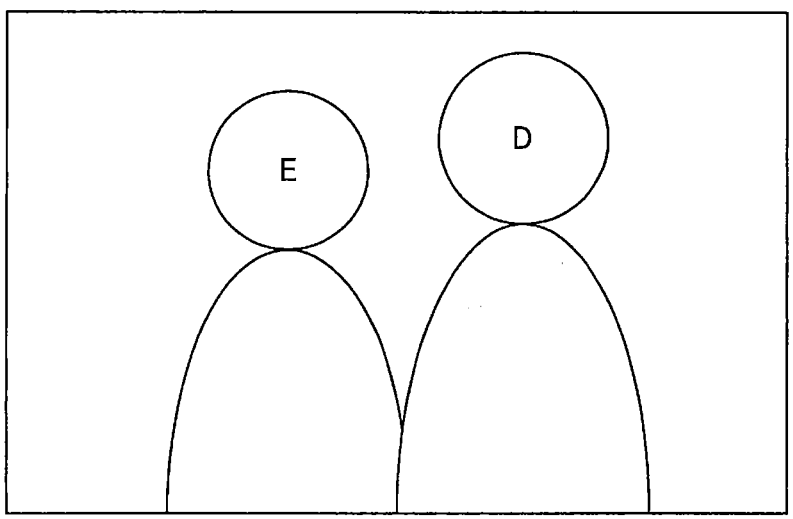
D: MALE, ADULT
E: FEMALE, ADULT
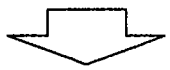
HUSBAND/WIFE OR BOYFRIEND/GIRLFRIEND

FIG. 24

| GROUP ID | GROUP TYPE |
|---|---|
| GP001 | FAMILY |
| GP002 | ... |
| ⋮ | ⋮ |

FIG. 25

| PERSON ID | | RELATIONSHIP |
|---|---|---|
| FC001 | FC002 | HUSBAND/WIFE |
| FC001 | FC009 | PARENT/CHILD |
| FC002 | FC009 | PARENT/CHILD |
| FC001 | FC011 | PARENT/CHILD |
| FC002 | FC011 | PARENT/CHILD |
| FC003 | FC005 | HUSBAND/WIFE OR BOYFRIEND/GIRLFRIEND |
| FC005 | FC006 | FRIENDS |
| ⋮ | ⋮ | ⋮ |

INFORMATION PROCESSING APPARATUS, INFORMATION PROCESSING METHOD, INFORMATION PROCESSING SYSTEM, AND PROGRAM

BACKGROUND

The present disclosure relates to an information processing apparatus, an information processing method, an information processing system, and a program.

With the improvement in image analysis technology, it becomes possible to estimate, based on information obtained by analyzing an image, information related to a subject in the image. For example, JP 2010-16796A describes that a face of a subject is recognized at the time of capturing an image, and based on the feature quantity thereof, a sex, a distance, an orientation of a face, a degree of smile, and the like are determined, and thus, a personal relationship and a degree of intimacy between subjects in the image are estimated.

SUMMARY

In this technical field, it is desired to further improve the accuracy in estimating the information related to the subject in the image. In light of the foregoing, it is desirable to provide an information processing apparatus, an information processing method, an information processing system, and a program, which are novel and improved, and which can improve the accuracy in estimating the information related to the subject in the image.

According to an embodiment of the present disclosure, there is provided an information processing apparatus which includes a face image acquisition section which acquires face images extracted from images which are classified into an identical time cluster by performing time clustering, and a person information generation section which classifies the face images for each time cluster, and generates person information in which persons regarded as an identical person are identified based on the face images which are classified.

According to such a configuration, face images are classified for each time cluster, and persons regarded as the identical person are identified. In the images classified into a same time cluster, it is highly likely that a same person in a same time period is included in a plurality of images. Accordingly, the accuracy of person identification is improved.

According to another embodiment of the present disclosure, there is provided an information processing method which includes acquiring face images extracted from images which are classified into an identical time cluster by performing time clustering, and classifying the face images for each time cluster, and generating person information in which persons regarded as an identical person are identified based on the face images which are classified.

According to another embodiment of the present disclosure, there is provided a program for causing a computer to function as an information processing apparatus including a face image acquisition section which acquires face images extracted from images which are classified into an identical time cluster by performing time clustering, and a person information generation section which classifies the face images for each time cluster, and generates person information in which persons regarded as an identical person are identified based on the face images which are classified.

According to the embodiments of the present disclosure described above, the accuracy in estimating the information related to the subject in the image can be improved.

BRIEF DESCRIPTION OF THE DRAWINGS

FIG. 4 is an example of image information used in the embodiment;

FIG. 5 is an example of face information used in the embodiment;

FIG. 6 is an example of face cluster information used in the embodiment;

FIG. 7 is an example of face feature quantity information used in the embodiment;

FIG. 8 is an explanatory diagram about a face feature quantity used in the embodiment;

FIG. 11 is an example of the error-eliminated face cluster information, which is used in the embodiment;

FIG. 12 is an example of the face feature quantity information of each face cluster used in the embodiment;

FIG. 15 is an example of person information generated in the embodiment;

FIG. 18 is an example of person group information of each time cluster generated in the embodiment;

FIG. 21 is an example of integrated person group information generated in the embodiment;

FIG. 22 is an explanatory diagram on an example of personal relationship calculation according to the embodiment;

FIG. 23 is an explanatory diagram on another example of personal relationship calculation according to the embodiment;

FIG. 24 is an example of group type information generated in the embodiment;

FIG. 25 is an example of personal relationship information generated in the embodiment;

DETAILED DESCRIPTION OF THE EMBODIMENT(S)

Figure 1:
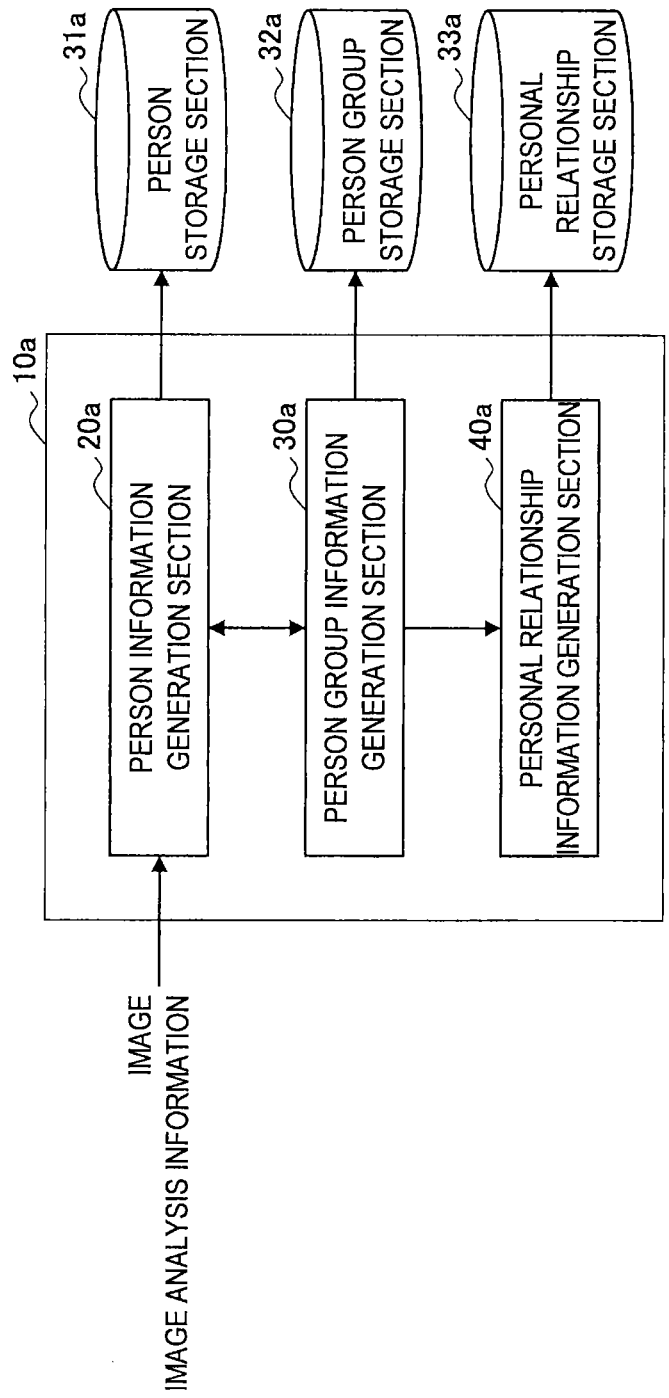
FIG. 1 is a schematic configuration diagram of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. First embodiment (estimation of subject information based on image analysis information)
    1-1. Schematic configuration
    1-2. Overall operation example
    1-3. Generation of image analysis information
    1-4. Detailed configuration example
2. Second embodiment (estimation of subject information further using SNS information)
    2-1. Schematic configuration
    2-2. Overall operation example
    2-3. Extraction of SNS information
    2-4. Detailed configuration example <1. First Embodiment (Estimation of Subject Information Based on Image Analysis Information)>

[1-1. Schematic Configuration]

First, with reference to FIG. 1, there will be described a schematic configuration of an information processing apparatus 10a according to a first embodiment of the present disclosure. FIG. 1 is a schematic configuration diagram of an information processing apparatus according to the first embodiment of the present disclosure.

The information processing apparatus 10a has a function of estimating subject information related to a subject in an image based on the image and image analysis information obtained by analyzing the image. Here, the subject information is a concept including information related to a person, a person group, and a personal relationship between persons. That is, the information processing apparatus 10a mainly includes a person information generation section 20a, a person group information generation section 30a, and a personal relationship information generation section 40a. Note that, although it is stated here that the information processing apparatus 10a has the function of the person information generation section 20a, the function of the person group information generation section 30a, and the function of the personal relationship information generation section 40a, the present technology is not limited thereto. The function of the person information generation section 20a, the function of the person group information generation section 30a, and the function of the personal relationship information generation section 40a may each be realized by a separate device. Further, a function described as one functional section may be realized by distributed processing performed by a plurality of information processing apparatuses.

The person information generation section 20a can identify persons who are regarded as an identical person based on images and image analysis information, and can store classified person information in a person storage section 31a. The person group information generation section 30a can generate person group information obtained by classifying the persons identified by the person information generation section 20a into groups, and can store the person group information in a person group storage section 32a. Further, the personal relationship information generation section 40a has a function of identifying the personal relationship between the persons classified by the person information generation section 20a based on the information of the groups classified by the person group information generation section 30a. The personal relationship information generation section 40a can store the identified personal relationship information in a personal relationship storage section 33a.

Here, the information processing apparatus 10a can gather the persons who are regarded as the identical person into a single face cluster using a clustering technique. However, when executing the face clustering on all images from the beginning based only on a degree of similarity between the face images, there was a case where the persons who look alike were gathered as a single person. For example, as for brothers with two-year age difference, when there are a photograph of the elder brother taken two years ago and a current photograph of the younger brother, there is a case where the brothers are gathered as a single person if their faces are similar to each other, since their ages are the same in the photographs. Further, even in the case of the identical person in reality, if the features of the person were changed with the elapse of time, the person was handled as another person, and it was difficult to perform tracking.

Accordingly, in the present embodiment, the accuracy of person identification is improved using a method involving identifying a person for each time cluster first, and gradually integrating the information thereof. In this case, the risk can be reduced that persons are erroneously identified as a same person, by eliminating the face image whose face feature quantity is largely different using the face feature quantity indicating a value of a predetermined attribute of the face. Further, by integrating face clusters based on the face feature quantity, the face clusters erroneously identified as different persons can be integrated. According to such processing, the accuracy of person identification can be enhanced. Further, with the enhancement in the accuracy of person identification, the accuracy in identifying a person group into which the person is classified is also enhanced. In addition, with the enhancement in the accuracy in identifying a person, the accuracy in identifying the personal relationship between the persons using the same can also be enhanced.

[1-2. Overall Operation Example]

Figure 2:
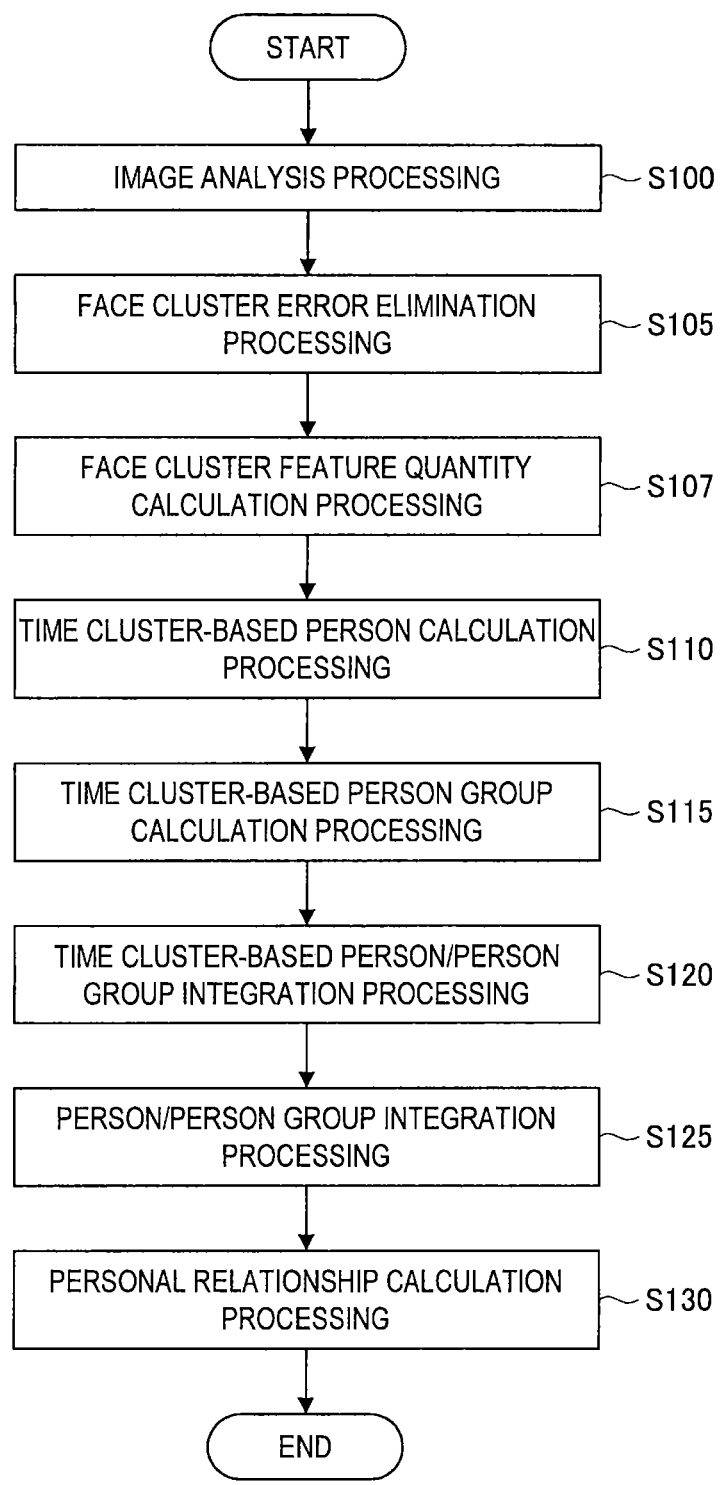
FIG. 2 is a flowchart showing an operation example of an information processing system according to the embodiment.

Next, with reference to FIG. 2, an operation example of an information processing system according to the present embodiment will be described. FIG. 2 is a flowchart showing an operation example of an information processing system according to the embodiment.

First, image analysis processing is performed on an image group that is a target to be processed (S100). The image analysis processing may be executed when person calculation processing is performed. Alternatively, the image analysis processing can also acquire accumulated image analysis information. Note that the image group used here may be an image group stored in an online storage, for example. For example, an apparatus which executes image analysis can acquire an image of a specific user from the online storage based on a user ID.

Here, the image analysis processing may include processing of generating a face image using facial recognition, for example. Further, the image analysis processing may include face clustering processing for classifying face images based on a degree of similarity. Further, the image analysis processing may include processing of calculating a face feature quantity that is a predetermined attribute value of a person. Further, the image analysis processing may include image time clustering processing that classifies images into time clusters.

Next, processing of eliminating error of a face cluster is performed (S105). The error elimination processing is performed using the face feature quantity calculated in the image analysis processing of Step S100. The detail of the face feature quantity is described later, and it is highly likely that face images having face feature quantities largely different from each other, the face feature quantity indicating an attribute value of a face, are face images of different persons. Accordingly, in the case where a face image having a largely different face feature quantity is included in a face cluster classified by the face clustering, error elimination processing for excluding the face image is performed.

Next, with respect to the face cluster after being subjected to the error elimination processing, the face feature quantity of each face cluster is calculated (S107). It is highly likely that the face images included in the error-eliminated face cluster belongs to the identical person. Accordingly, the face feature quantity of each face cluster can be calculated using the face feature quantity of each face image calculated by the image analysis processing of Step S100. For example, the face feature quantity of each face cluster calculated here may be the average of face feature quantities of respective face images included in the face cluster.

Next, the person information generation section 20a can execute time cluster-based person calculation processing (S110). Here, the time cluster indicates a group, the group being clustered on the basis of event based on date/time at which the image is captured, for example. The event may be, for example, "sports day", "journey", and "party". It is highly likely that the same person or the same group repeatedly appears in the images captured in those events. Further, since the event is a group that is clustered based on time, the following case does not occur: the photograph of the elder brother taken two years ago and the current photograph of the younger brother are mixed up. Accordingly, the accuracy of person calculation can be enhanced by performing the person calculation processing for identifying the identical person for each time cluster. Specifically, the person information generation section 20a can perform processing of integrating face clusters using the face feature quantity of each face cluster. The person information generation section 20a regards face clusters having the face feature quantities close to each other and not appearing in the same image as a single person, and integrates the face clusters.

Then, the person group information generation section 30a can execute, time cluster-based person group calculation processing (S115). It is highly likely that the same group repeatedly appears in the images classified into the same event. Further, in this case, the person group information generation section 30a uses information of a person calculated for each time cluster and classifies the person into a group. Therefore, it is highly likely that the person group calculated for each time cluster has high accuracy.

Next, the person information generation section 20a and the person group information generation section 30a can execute time cluster-based person/person group integration processing (S120). The time cluster-based person/person group integration processing is processing for enhancing the accuracy in calculating the person and the person group by using person information and person group information in combination, for example. For example, based on constituents (number of persons, ratio of men to women, ratio of age) of a face cluster group included in the person group, integration of groups and re-integration of persons accompanied therewith can be executed.

Further, when the person information and the person group information are generated for each time cluster by performing the processing described above, next, the person information generation section 20a and the person group information generation section 30a can execute the person/person group integration processing (S125). The person/person group integration processing can identify a person and a person group over time clusters. In this case, an estimated birth year is used, which is calculated based on the date/time at which the image is captured and the face feature quantity of each face cluster, and thus, the accuracy in identifying the person and the person group can be further enhanced. According to the person/person group integration processing, since the groups each identified for each time cluster are integrated, information can be obtained which is related to the changes in group constituents with the elapse of time.

Next, the personal relationship information generation section 40a can execute processing of calculating a personal relationship between persons using the person information and the person group information obtained by the person/person group integration processing (S130). The personal relationship information generation section 40a determines a group type based on the constituents of the person group, for example. Then, the personal relationship information generation section 40a can calculate the personal relationship based on an attribute value of each person in the group. For example, the attribute value of a person to be used here may be sex, age, and the like.

[1-3. Generation of Image Analysis Information]

Figure 3:
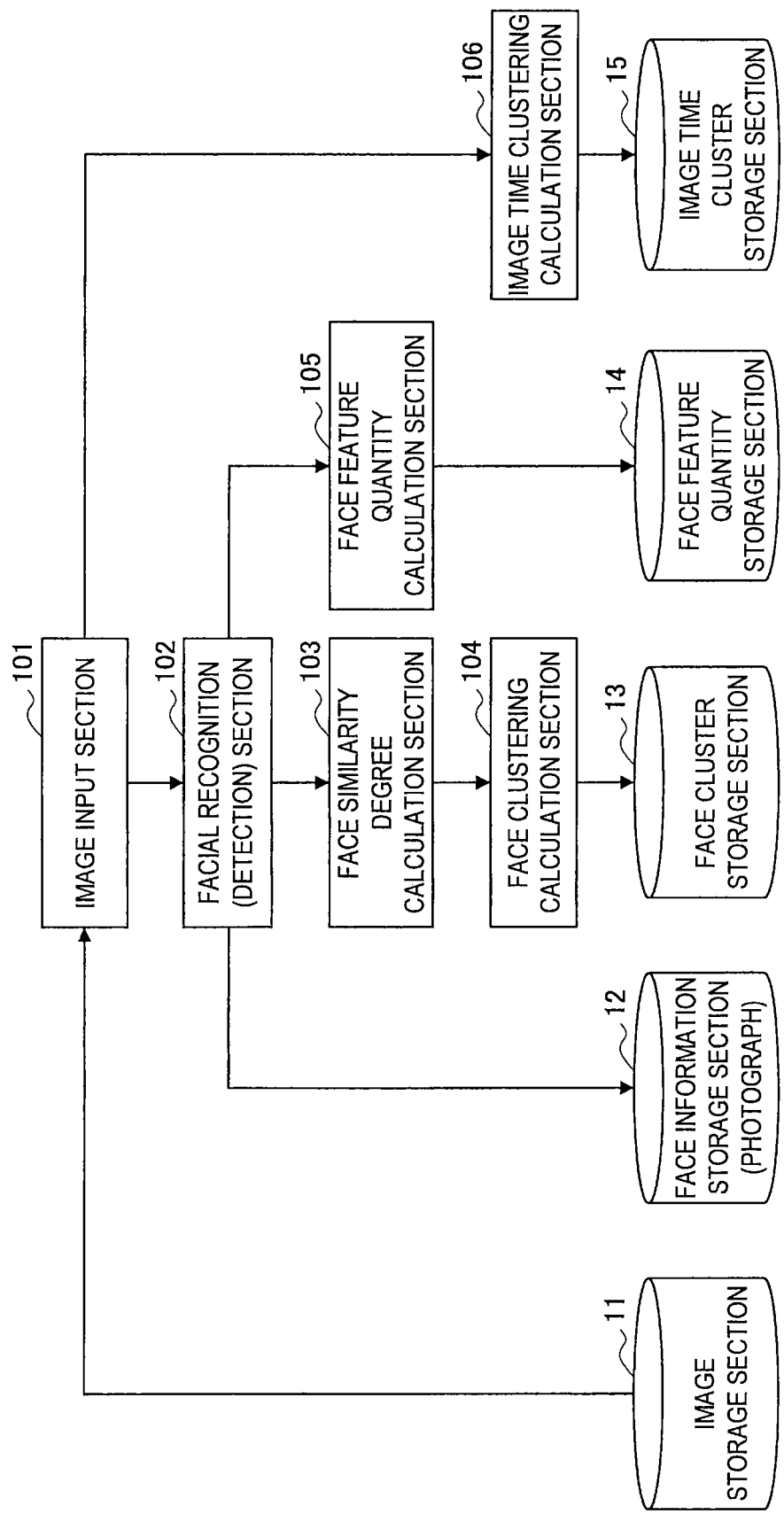
FIG. 3 is an explanatory diagram illustrating generation of image analysis information used in the embodiment.
Figures 9, 10:
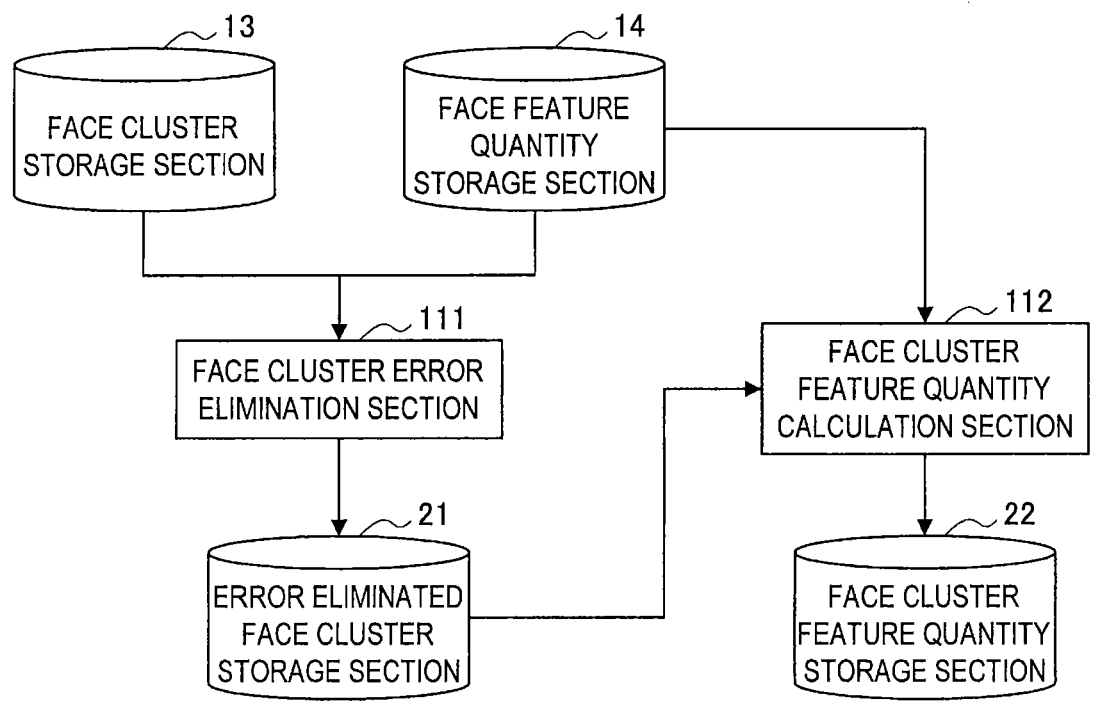
FIG. 9 is an example of image time cluster information used in the embodiment.
FIG. 10 is an explanatory diagram illustrating generation of the image analysis information used in the embodiment.

Here, with reference to FIGS. 3 to 12, there will be described generation of image analysis information used for generating person information, person group information, and personal relationship information. FIG. 3 is an explanatory diagram illustrating generation of image analysis information used in the embodiment. FIG. 4 is an example of image information used in the embodiment. FIG. 5 is an example of face information used in the embodiment. FIG. 6 is an example of face cluster information used in the embodiment. FIG. 7 is an example of face feature quantity information used in the embodiment. FIG. 8 is an explanatory diagram about a face feature quantity used in the embodiment. FIG. 9 is an example of image time cluster information used in the embodiment. FIG. 10 is an explanatory diagram illustrating generation of the image analysis information used in the embodiment. FIG. 11 is an example of the error-eliminated face cluster information, which is used in the embodiment. FIG. 12 is an example of the face feature quantity information of each face cluster used in the embodiment.

First, referring to FIG. 3, the image analysis information can be generated using, for example, an image input section 101, a facial recognition (detection) section 102, a face similarity degree calculation section 103, a face clustering calculation section 104, a face feature quantity calculation section 105, and an image time clustering calculation section 106.

The image input section 101 can acquire image information to be analyzed from the image storage section 11 and can supply the facial recognition (detection) section 102 and the image time clustering calculation section 106 with the image information. The image information stored in the image storage section 11 may include, as shown in FIG. 4, for example, image files and various types of metadata. The metadata may include a title, a capturing date/time, a capturing location, tag information, and the like. Further, the metadata may also include information related to capturing conditions, such as resolution, capturing direction, shutter speed, diaphragm (F value), flash on/off, and focal distance.

The facial recognition (detection) section 102 can recognize a face region of a person in the image based on the image information supplied by the image input section 101 and can generate a face image. The facial recognition (detection) section 102 can store the generated face image in a face information storage section 12, and can also supply the face similarity degree calculation section 103 and the face feature quantity calculation section 105 with the face image. FIG. 5 shows an example of the face information generated here. In the face information, a face thumbnail image is stored in association with information of extracting source content.

The face similarity degree calculation section 103 can calculate a degree of similarity between face images using the face information supplied by the facial recognition (detection) section 102. The degree of similarity between faces calculated here is used for the face clustering for classifying the face images. The face similarity degree calculation section 103 can supply the face clustering calculation section 104 with information on the calculated degree of similarity between faces.

The face clustering calculation section 104 can classify face images based on the degree of similarity between face images calculated by the face similarity degree calculation section 103. A group into which face images are classified is referred to as face cluster. An example of the face cluster information is shown in FIG. 6. The face cluster information may be information in which a face cluster ID for identifying a face cluster is associated with face images classified into the face cluster. The face clustering calculation section 104 can store the generated face cluster information in a face cluster storage section 13.

The face feature quantity calculation section 105 analyzes the face information supplied by the facial recognition (detection) section 102, and thus can calculate a face feature quantity of each face image. The face feature quantity calculation section 105 can store the calculated face feature quantity information in a face feature quantity storage section 14.

An example of the face feature quantity calculated here is shown in FIG. 7. The face feature quantity can include age, sex, a degree of babyness, a degree of adultness, and a degree of agedness, for example. With reference to FIG. 8, an attribute of each face feature quantity will be described. For example, the age as an example of the face feature quantity can be set to a value from 0 to 90. For example, the age may be shown in 10-year blocks. Note that, although the age is shown in 10-year blocks here, the present technology is not limited thereto. For example, the age included in the face feature quantity may also be shown in 1-year blocks. Further, the sex as an example of the face feature quantity represents an estimated sex. The sex can be set to a value from 0.0 to 1.0. The closer the value is to 0.0, the person is more likely to be a female, and the closer the value is to 1.0, the person is more likely to be a male.

Further, the degree of babyness as an example of the face feature quantity represents a certainty factor indicating whether a person is a baby. The degree of babyness can be set to a value from 0.0 to 1.0. The closer the value is to 1.0, the probability that the person is a baby is high, and the closer the value is to 0.0, the probability that the person is a baby is low. Further, the degree of agedness as an example of the face feature quantity represents a certainty factor indicating whether a person is an adult. The degree of adultness can be set to a value from 0.0 to 1.0. The closer the value is to 1.0, the probability that the person is an adult is high, and the closer the value is to 0.0, the probability that the person is an adult is low. Further, the degree of agedness as an example of the face feature quantity represents a certainty factor indicating whether a person is an aged person. The degree of agedness can be set to a value from 0.0 to 1.0. The closer the value is to 1.0, the probability that the person is an aged person is high, and the closer the value is to 0.0 the probability that the person is an aged person is low.

The image time clustering calculation section 106 can classify the images based on time using clustering processing. For example, the image time clustering calculation section 106 can classify the image group supplied by the image input section 101 on the basis of event, using date/time at which each image is captured. The image time clustering calculation section 106 can store the generated image time cluster information in an image time cluster storage section 15. For example, FIG. 9 shows an example of the image time cluster information generated here. The image time cluster information may include information in which a time cluster ID for identifying a time cluster is associated with image files classified into the time cluster.

Next, with reference to FIG. 10, there will be described an example of image analysis information which is further generated based on various types of image analysis information generated in the above processing. For example, the image analysis information is generated by a face cluster error elimination section 111 and a face cluster feature quantity calculation section 112.

The face cluster error elimination section 111 can generate error-eliminated face cluster information based on the face cluster information acquired from the face cluster storage section 13 and the face feature quantity information acquired from the face feature quantity storage section 14. The face cluster error elimination section 111 can store the generated error eliminated face cluster information in an error eliminated face cluster storage section 21. Specifically, the face cluster error elimination section 111 can compare, for each face cluster, the face feature quantities of the face images classified into the face cluster with each other, and can exclude, from the face cluster, the face image having a value extremely different from the face feature quantities of the other face images classified into the same face cluster. In this case, the face cluster error elimination section 111 can detect the face image having an outlier using standard deviation, for example.

For example, among the pieces of face cluster information shown in FIG. 6, let us consider about the face cluster whose face cluster ID is FC001. The face cluster error elimination section 111 can acquire, from the face cluster information stored in the face cluster storage section 13, the information indicating that the face images included in FC001 are "001.jpg, 002.jpg, and 003.jpg". Accordingly, after that, the face cluster error elimination section 111 acquires the pieces of face feature quantity information with respect to the face images from the face feature quantity storage section 14. Referring to the face feature quantity information shown in FIG. 7, among the face images "001.jpg, 002.jpg, and 003.jpg", it can be seen that only "003.jpg" has an extremely different feature quantity. Accordingly, the face cluster error elimination section 111 excludes "003.jpg" from the face cluster FC001. The face cluster information after the exclusion is shown in FIG. 11.

The face cluster feature quantity calculation section 112 can calculate the face feature quantity of each face cluster using the face cluster information from which the error is eliminated by the face cluster error elimination section 111 based on the face feature quantity. For example, the face cluster feature quantity calculation section 112 may calculate the face feature quantity of the face cluster by determining an average of the feature quantities of the face images classified into the face cluster.

The image analysis information described above may be generated by distributed processing performed by a plurality of information processing apparatuses, for example. Further, the image analysis information may be generated inside the information processing apparatus 10*a*. There will be described next an example of a detailed configuration of the information processing apparatus 10*a* for generating person, person group, and personal relationship information using the image analysis information.

[1-4. Detailed Configuration Example]

Figure 13:
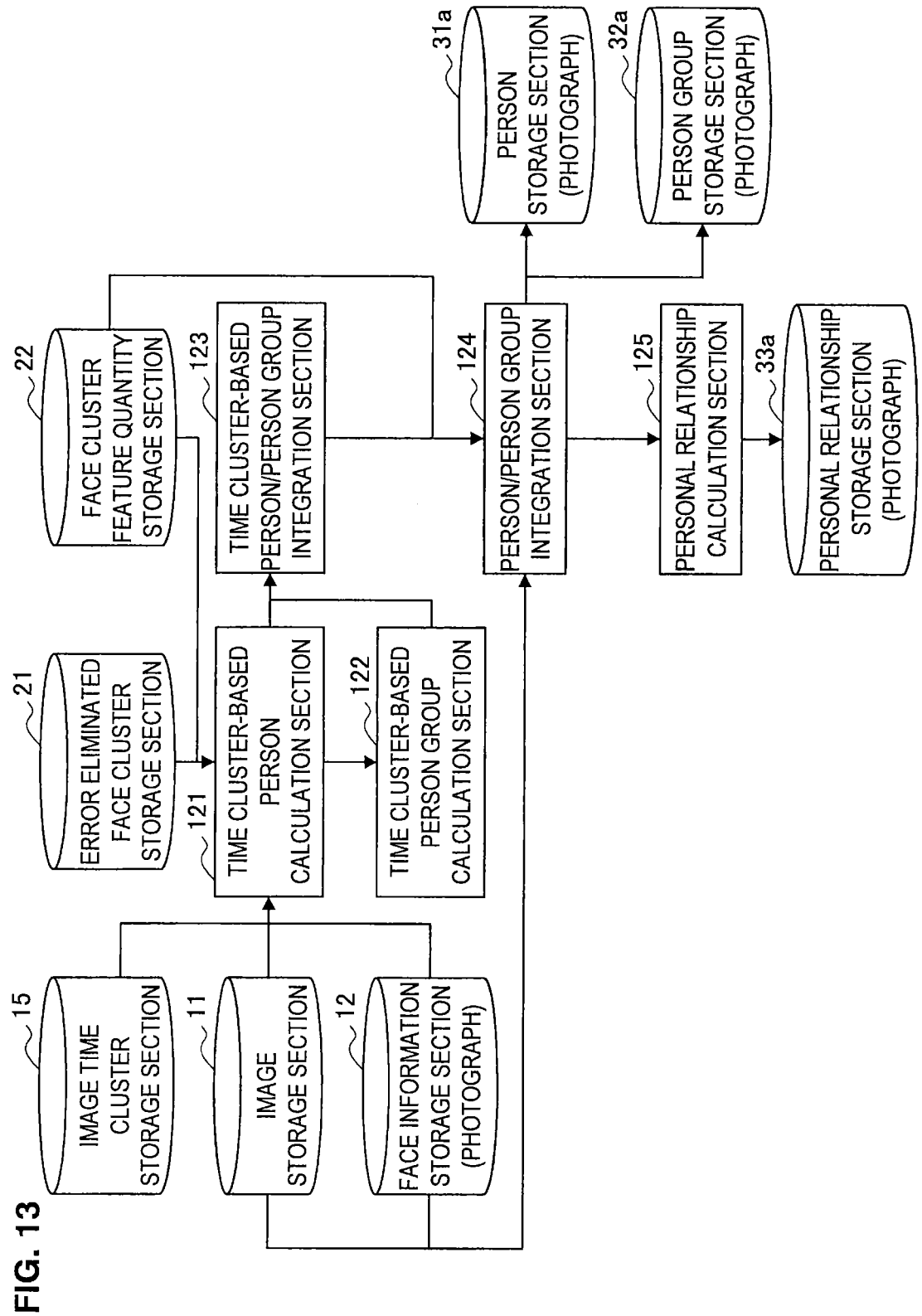
FIG. 13 is an explanatory diagram showing a detailed configuration example of the information processing apparatus according to the embodiment.
Figure 14:
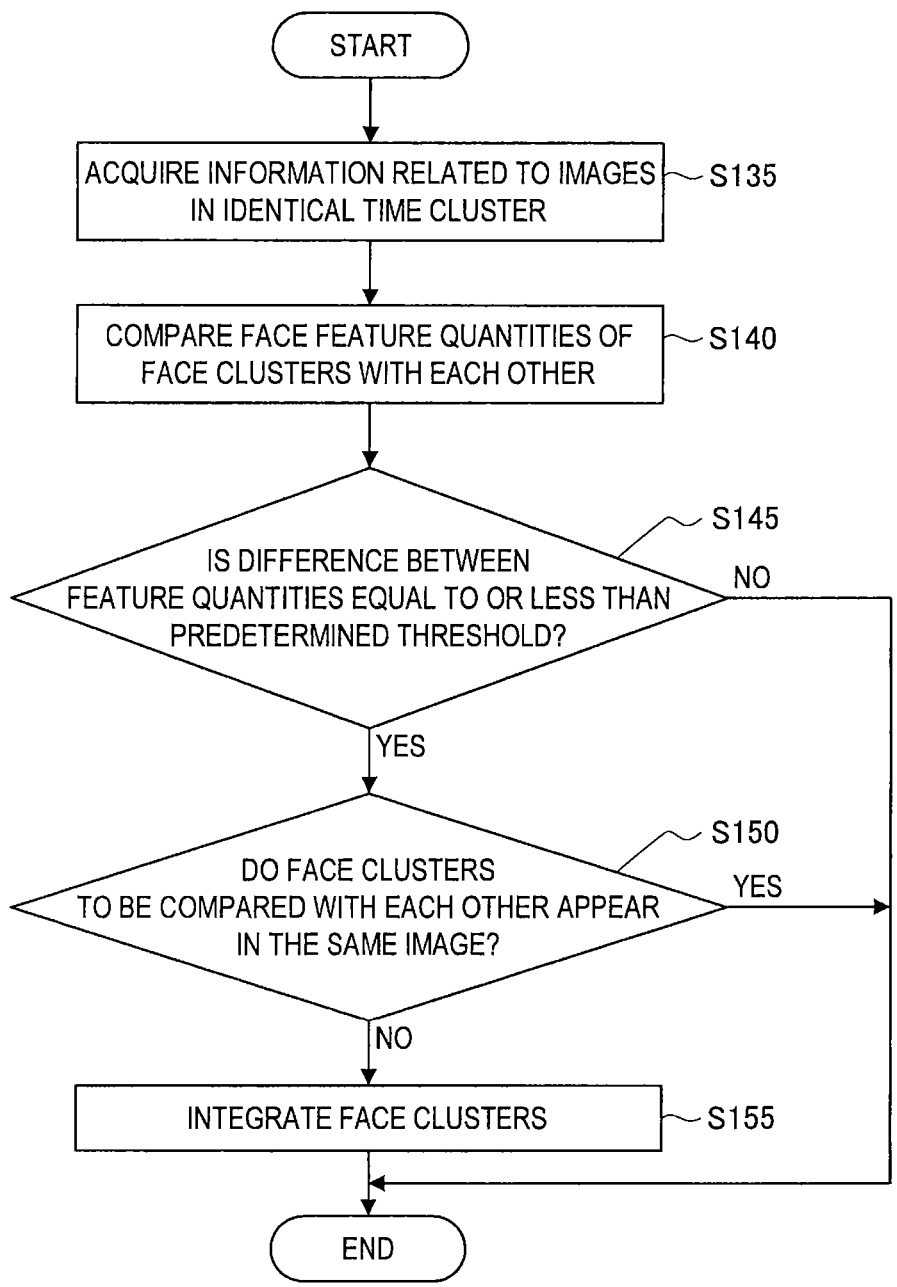
FIG. 14 is a flowchart showing person identification processing according to the embodiment.
Figure 16:
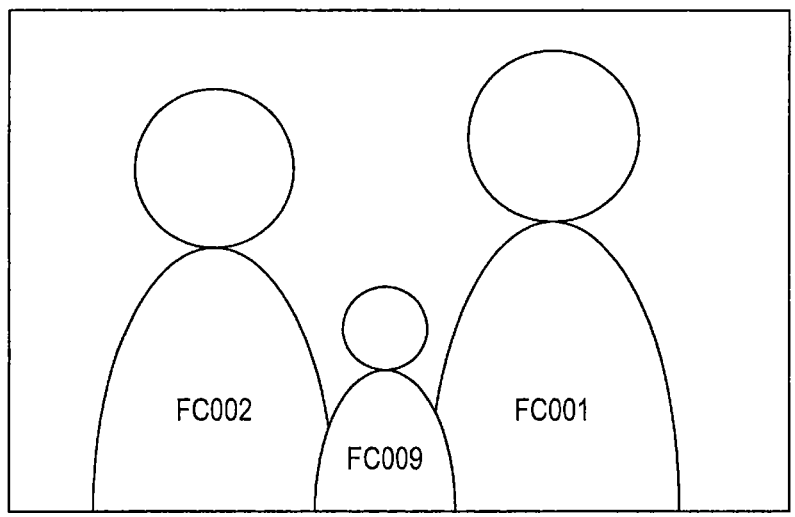
FIG. 16 is an explanatory diagram illustrating effects of person integration processing according to the embodiment.
Figure 17:
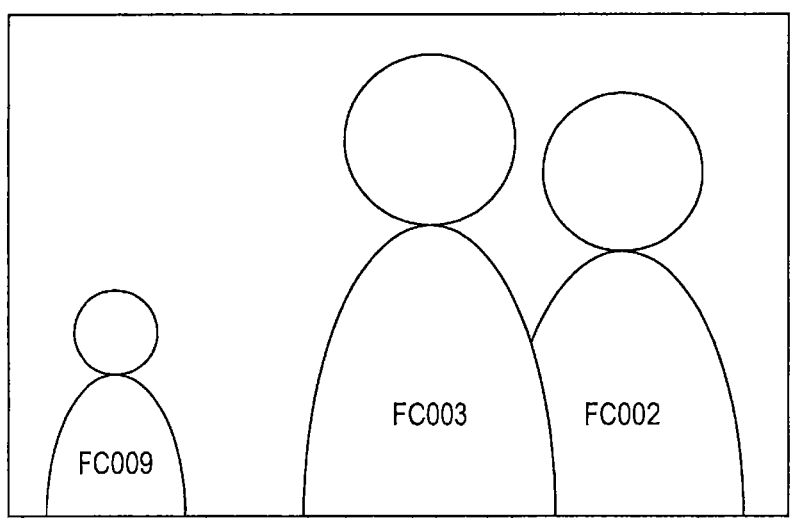
FIG. 17 is an explanatory diagram illustrating effects of the person integration processing according to the embodiment.
Figures 19, 20:
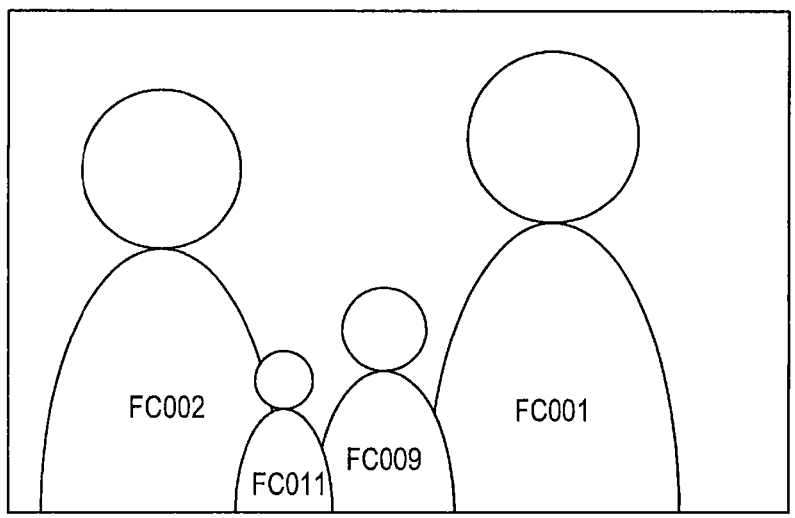
FIG. 19 is an explanatory diagram illustrating person group identification according to the embodiment.
FIG. 20 is another example of the person group information of each time cluster generated in the embodiment.

Next, with reference to FIGS. 13 to 25, there will be described an example of a detailed configuration of the information processing apparatus 10*a* according to the present embodiment. FIG. 13 is an explanatory diagram showing a detailed configuration example of the information processing apparatus according to the embodiment. FIG. 14 is a flowchart showing person identification processing according to the embodiment. FIG. 15 is an example of person information generated in the embodiment. FIG. 16 is an explanatory diagram illustrating effects of person integration processing according to the embodiment. FIG. 17 is an explanatory diagram illustrating effects of the person integration processing according to the embodiment. FIG. 18 is an example of person group information of each time cluster generated in the embodiment. FIG. 19 is an explanatory diagram illustrating person group identification according to the embodiment. FIG. 20 is another example of the person group information of each time cluster generated in the embodiment. FIG. 21 is an example of integrated person group information generated in the embodiment. FIG. 22 is an explanatory diagram on an example of personal relationship calculation according to the embodiment. FIG. 23 is an explanatory diagram on another example of personal relationship calculation according to the embodiment. FIG. 24 is an example of group type information generated in the embodiment. FIG. 25 is an example of personal relationship information generated in the embodiment.

For example, the person information generation section 20*a* can have functions of a time cluster-based person calculation section 121, a time cluster-based person/person group integration section 123, and a person/person group integration section 124. Further, the person group information generation section 30*a* can have functions of a time cluster-based person group calculation section 122, the time cluster-based person/person group integration section 123, and the person/person group integration section 124. Further, the personal relationship information generation section 40*a* may be realized by the function of a personal relationship calculation section 125.

The time cluster-based person calculation section 121 can classify, for each time cluster, persons who are regarded as the identical person into a single face cluster. An operation example of the person calculation processing executed by the time cluster-based person calculation section 121 is shown in FIG. 14. The time cluster-based person calculation section 121 acquires information related to images which are classified into the identical time cluster (S135). For example, the time cluster-based person calculation section 121 can acquire the error eliminated face cluster information from the error eliminated face cluster storage section 21, and can acquire face cluster feature quantity information from a face cluster feature quantity storage section 22. Then, the time cluster-based person calculation section 121 compares the face feature quantities of the face clusters with each other (S140).

The time cluster-based person calculation section 121 determines whether or not the difference between the face feature quantities of the face clusters is equal to or less than a predetermined threshold (S145). In the case where it is determined in Step S145 that the difference between the face feature quantities is not equal to or less than the predetermined threshold, the two face clusters compared with each other are determined to belong to different persons, and the processing is terminated.

On the other hand, in the case where it is determined in Step S145 that the difference between the face feature quantities of the face clusters is equal to or less than the predetermined threshold, then the time cluster-based person calculation section 121 determines whether the two face clusters to be compared with each other appear in the same image (S150). If the two persons are the same person, they do not appear in the same image. Accordingly, in the case where it is determined in Step S150 that the face images appear in the same image, the two face clusters to be compared with each other are determined to belong to different persons, and the processing is terminated.

On the other hand, in the case where it is determined in Step S150 that the two face images classified into the face clusters to be compared with each other are not included in the same image, the time cluster-based person calculation section 121 integrates the face clusters (S155). For example, as for the face cluster information shown in FIG. 11, when there is considered a case of comparing the face cluster FC001 with the face cluster FC003, in the case where the difference between the face feature quantities of FC001 and FC003 is within the predetermined threshold and where the face images included in the face clusters do not appear in the same image, that is, in the case where the pieces of extracting source content of 001.jpg, 002.jpg, 009.jpg, and 010.jpg are the pieces of content different from each other, the face cluster FC001 and the face cluster FC003 are integrated. An example of the integrated face cluster information is shown in FIG. 15.

The time cluster-based person calculation section 121 executes the person calculation processing shown in FIG. 14 for each time cluster, and for each combination of face clusters, and thus, the accuracy in classifying the face clusters (that is, the accuracy of person identification) is enhanced. With the enhancement in the accuracy of person identification, the accuracy in identifying a person group using the person information is also enhanced. For example, let us assume that the image shown in FIG. 16 and the image shown in FIG. 17 are classified into the same time cluster. In this case, in the case of the face clustering simply using the degree of similarity, the face cluster FC001 and the face cluster FC003 are regarded as different persons. However, by performing the time cluster-based person calculation processing described above, integration processing using the face feature quantities is performed, and the face cluster FC001 and the face cluster FC003 are identified as the identical person. In this way, FC003 and FC001 are integrated, and hence, the image shown in FIG. 16 and the image shown in FIG. 17 are each regarded as the image in which FC001, FC002, and FC009 are captured concurrently. Accordingly, if there are a plurality of images in which FC001, FC002, and FC009 are captured concurrently, FC001, FC002, and FC009 are classified into one group.

The time cluster-based person group calculation section 122 has a function of calculating a person group for each time cluster. The time cluster-based person group calculation section 122 can calculate a person group using images classified into the same time cluster. The time cluster-based person group calculation section 122 can calculate a person group based on a combination of persons (face clusters) who appear in the same image, for example. As described with reference to FIG. 16 and FIG. 17, if there are a plurality of images in which face clusters FC001, FC002, and FC009 are captured concurrently, the time cluster-based person group calculation section 122 can classify the face clusters FC001, FC002, and FC009 into the same group. An example of the person group information generated in this case is shown in FIG. 18. For example, the person group information generated for each time cluster may include a time cluster ID, a group ID, and a face cluster ID included in a person group.

The time cluster-based person group calculation section 122 calculates the person group for each time cluster. For example, the person group generated in a time cluster TC001 is shown in FIG. 18, and, in the same manner, also for a time cluster TC002, a person group is calculated using the images classified into the time cluster TC002. For example, in the time cluster TC002, as shown in FIG. 19, let us assume that there are a plurality of images in which face clusters FC001, FC002, FC009, and FC011 are captured concurrently. An example of the person group information generated in this case is shown in FIG. 20. A group ID is assigned to each of the classified person groups.

The time cluster-based person/person group integration section 123 can perform processing of integrating groups based on constituents (number of persons, ratio of men to women, ratio of age) of a face cluster group included in the person group. For example, when there are a group of FC001, FC002, and FC009 and a group of FC001, FC004, and FC009, in the case where the attributes and the face feature quantities of FC002 and FC004 are close to each other, the two groups may be integrated. With the above, the re-integration of face clusters may also be performed. That is, in the above example, the face clusters FC002 and FC004 are integrated.

The person/person group integration section 124 can generate the person information and the person group information by executing the same processing as the processing for each time cluster on all input image groups, regardless of the time cluster. In this case, an estimated birth year may be used, which is calculated based on the date/time at which the image is captured and an age attribute value. For example, the person/person group integration section 124 can execute the person calculation processing shown in FIG. 14 on all input image groups, regardless of the time cluster. In this case, in the face clusters to be compared with each other, there may be included images of the identical person at different age stages. Therefore, even in the case of the identical person in reality, there may be a difference between face feature quantities of the face clusters. Accordingly, the threshold may be set to a larger value than in the case of comparing the face feature quantities for each time cluster.

Further, in integrating person groups, the person/person group integration section 124 can determine whether the groups are the same by comparing constituents of the face clusters included in the groups. For example, when the constituents of the face clusters included in the group G001 shown in FIG. 18 are compared with the constituents of the face clusters included in the group G011 shown in FIG. 20, the group G011 has constituents in which the face cluster F011 is added to the constituents of the group G001. Accordingly, the person/person group integration section 124 can determine that the group G001 and the group G011 are the same person group. For example, an example of the person group information generated by the person/person group integration section 124 is shown in FIG. 21. In this way, the person group information is stored with the time cluster ID, and thus, information of the changes in group constituents with the elapse of time can be included. For example, the person information according to the present embodiment, which is generated by integrating information of the person group identified for each time cluster, is capable of retaining the information of the change, in the case where increase or decrease occurs in the number of the gathered members and in the case where the number of members in a family increases with the elapse of time. It is difficult to obtain such effects even if the same processing is performed to all the input images from the beginning.

The person/person group integration section 124 can store the generated person information in the person storage section 31a. Further, the person/person group integration section 124 can store the generated person group information in the person group storage section 32a.

The personal relationship calculation section 125 can generate personal relationship information between persons using the person information and the person group information generated by the person/person group integration section 124. In this case, first, the personal relationship calculation section 125 can determine a group type based on the constituents of the person group. Further, the personal relationship calculation section 125 calculates the personal relationship based on an attribute value of each person included in the group.

For example, as shown in FIG. 22, in the case where three persons are included in a group, the three person formed of: a person A being male, adult; a person B being female, adult; and a person C being male, child, the personal relationship calculation section 125 may determine that the group is a family group. Further, the personal relationship calculation section 125 can determine that the personal relationship between the person A and the person B is husband/wife, the personal relationship between the person A and the person C is parent/child, and the personal relationship between the person B and the person C is parent/child.

Alternatively, as shown in FIG. 23, in the case where two persons are included in a group, the two persons formed of: a person D being male, adult; and a person E being female, adult, the personal relationship calculation section 125 may determine that the personal relationship between the person D and the person E is husband/wife or boyfriend/girlfriend.

In this way, the personal relationship calculation section 125 can determine the type of each group based on the attribute values of the persons included in the group and can generate the group type information as shown in FIG. 24. In this case, when the number of persons included in a group is two, the group type may correspond to the personal relationship. Further, the personal relationship calculation section 125 can also calculate the personal relationship between persons based on the group type and the attribute value (sex, age, and the like) of each person included in the group.

Heretofore, an example of the information processing apparatus 10a according to the present embodiment has been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the information processing apparatus 10a according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

<2. Second Embodiment (Estimation of Subject Information Further Using SNS Information)>

[2-1. Schematic Configuration]

Figure 26:
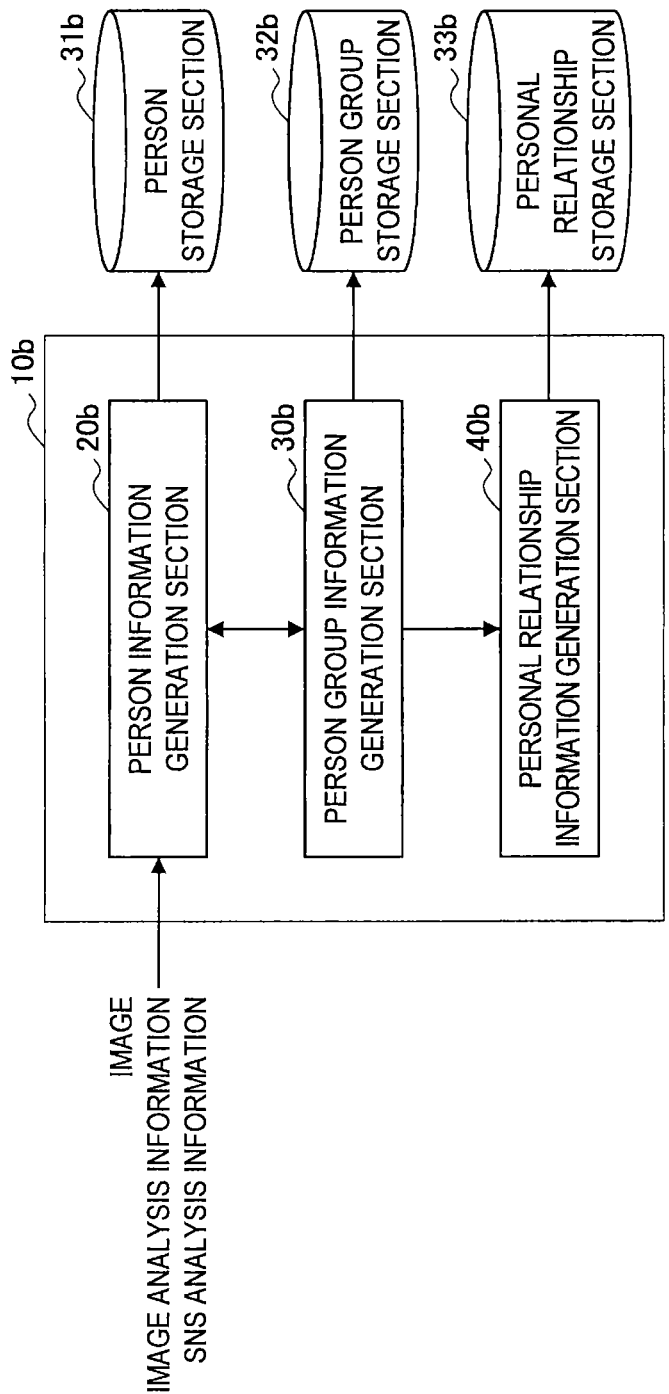
FIG. 26 is a schematic configuration diagram of an information processing apparatus according to a second embodiment of the present disclosure.

With reference to FIG. 26, there will be described a schematic configuration of an information processing apparatus 10b according to a second embodiment of the present disclosure. FIG. 26 is a schematic configuration diagram of an information processing apparatus according to the second embodiment of the present disclosure.

In the first embodiment described above, there has been described the function of identifying information related to a subject in an image based on the image analysis information obtained by analyzing the image. In the present embodiment, the accuracy in identifying the information related to the subject is enhanced using information of an SNS (Social Network Service).

Here, the SNS represents a community type membership-based service that supports the links between people, for example. The SNS is a service in which a user typically registers his/her own profile and which provides the users with an opportunity to communicate with other users who have a common link. Further, in the present embodiment, the SNS may also include a blog service having a function of communicating with other users (for example, posting a comment online and sending an e-mail). The blog service may include a mini blog service for posting a sentence with a limited small number of characters. Alternatively, the SNS according to the present embodiment can also include a community type service that uses photographs and videos such as moving images as main communication tools.

The information processing apparatus 10b can acquire SNS information acquired by using a Web API (Application Program Interface) of the SNS opened to the public, or SNS analysis information obtained by analyzing the SNS information. The SNS information acquired here may vary depending on the specification of the SNS or publishing settings of the user. For example, the SNS information can include registration information (for example, name, date of birth, family structure, friend information, and profile photograph) registered in the SNS by the user based on actual facts, and usage history information (for example, history of making contact with another user and e-mail transmission history) generated by the user using the SNS.

In the present embodiment, the analysis of the SNS information is performed by a server or the like which is different from the information processing apparatus 10b. The information processing apparatus 10b can generate person information, person group information, and personal relationship information using the SNS analysis information in addition to an image and image analysis information. In this way, the accuracy of information related to the subject to be generated can be further enhanced.

The information processing apparatus 10b mainly includes a person information generation section 20b, a person group information generation section 30b, and a personal relationship information generation section 40b. Note that, although it is stated here that the information processing apparatus 10b has the function of the person information generation section 20b, the function of the person group information generation section 30b, and the function of the personal relationship information generation section 40b, the present technology is not limited thereto. The function of the person information generation section 20b, the function of the person group information generation section 30b, and the function of the personal relationship information generation section 40b may each be realized by a separate device. Further, a function drawn as one functional section may be realized by distributed processing performed by a plurality of information processing apparatuses.

In addition to the function of the person information generation section 20a according to the first embodiment, the person information generation section 20b has a function of identifying a person using the SNS analysis information. For example, the person information generation section 20b can generate person information based on person information included in the SNS analysis information and person information identified based on the image. The person information generation section 20b compares a face image included in the SNS analysis information with a face image included in a face cluster, and integrates the persons regarded as the identical person, and thus can identify the person. In addition, the person information generation section 20b further compares attribute information (sex, age, and the like) obtained by analyzing the image with profile information included in the SNS analysis information, and integrates the persons regarded as the identical person, and thus can identify the person. The person information generation section 20b can store the generated person information in a person storage section 31b.

In addition to the function of the person group information generation section 30a according to the first embodiment, the person group information generation section 30b has a function of identifying a person group using the SNS analysis information. For example, the person group information generation section 30b can generate person group information based on a person group included in the SNS analysis information and a person group identified based on the image. For example, the person group information generation section 30b compares the constituents of the person group identified based on the image with the constituents of the person group included in the SNS analysis information, and integrates the person groups, and thus can identify the person group.

In addition to the function of the personal relationship information generation section 40a according to the first embodiment, the personal relationship information generation section 40b has a function of identifying a personal relationship using the SNS analysis information. For example, the personal relationship information generation section 40b compares personal relationship information included in the SNS analysis information with personal relationship information identified based on the image, and integrates those pieces of personal relationship information, and thus can identify the personal relationship. In the case where the personal relationship information included in the SNS analysis information overlaps with the personal relationship information identified based on the image, the personal relationship information generation section 40b can integrate those pieces of personal relationship information. Further, in the case where those pieces of personal relationship information do not overlap with each other, those pieces of personal relationship information can be extracted as they are as separate pieces of personal relationship information.

[2-2. Overall Operation Example]

Figure 27:
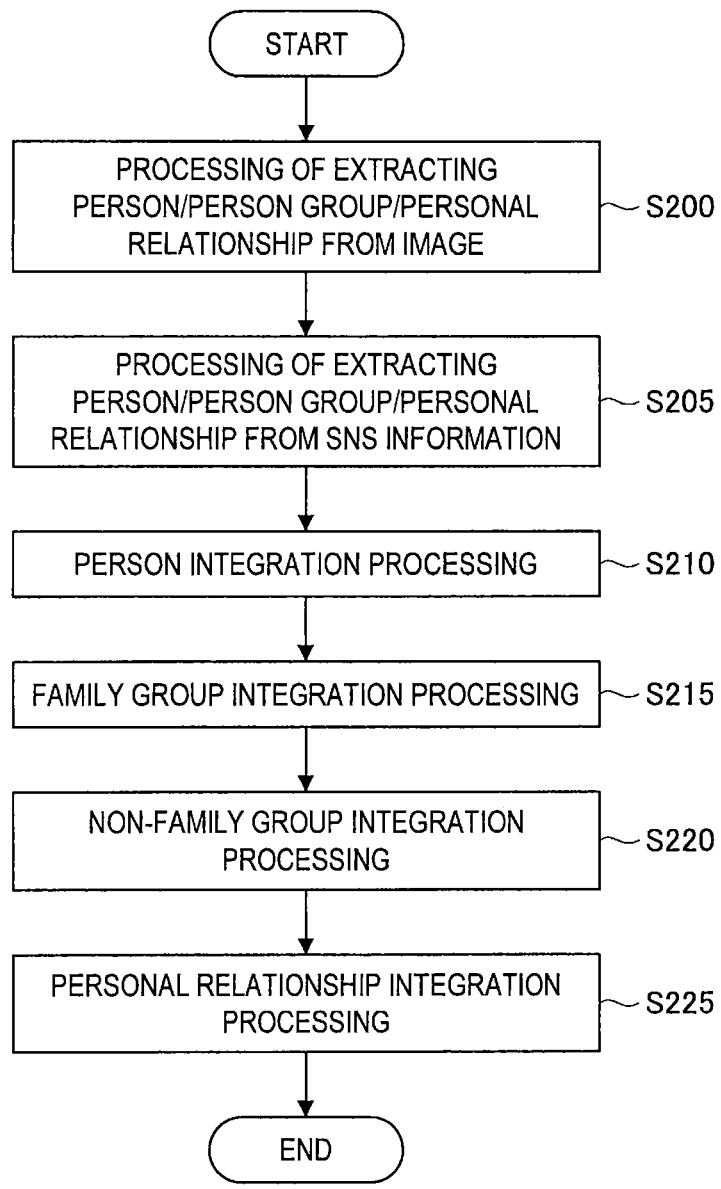
FIG. 27 is a flowchart showing an operation example of an information processing system according to the embodiment.

Next, with reference to FIG. 27, an operation example of an information processing system according to the second embodiment of the present disclosure will be described. FIG. 27 is a flowchart showing an operation example of an information processing system according to the embodiment.

First, there is executed processing of extracting a person, a person group, and a personal relationship from an image (S200). The processing of extracting a person, a person group, and a personal relationship performed in Step S200 may be realized by the function of the information processing apparatus 10a described in the first embodiment, for example.

Next, there is executed processing of extracting a person, a person group, and a personal relationship from SNS information (S205). The detailed processing contents of Step S205 will be described later. After that, the person information generation section 20b executes person integration processing (S210). The person integration processing is performed by integrating the person information from the image extracted in Step S200 with the person information from the SNS information extracted in Step S205.

Next, the person group information generation section 30b executes family group integration processing (S215). The family group integration processing is performed by comparing a group classified into a family group among the person group information from the image extracted in Step S200 with a group classified into a family group among the person group information from the SNS information extracted in Step S205. Then, the person group information generation section 30b performs non-family group integration processing (S220). The non-family group integration processing is performed by comparing a group classified into a group other than the family group among the person group information from the image extracted in Step S200 with a group classified into a group other than the family group among the person group information from the SNS information extracted in Step S205. Finally, the personal relationship information generation section 40b executes personal relationship integration processing (S225).

[2-3. Extraction of SNS Information]

Figure 28:
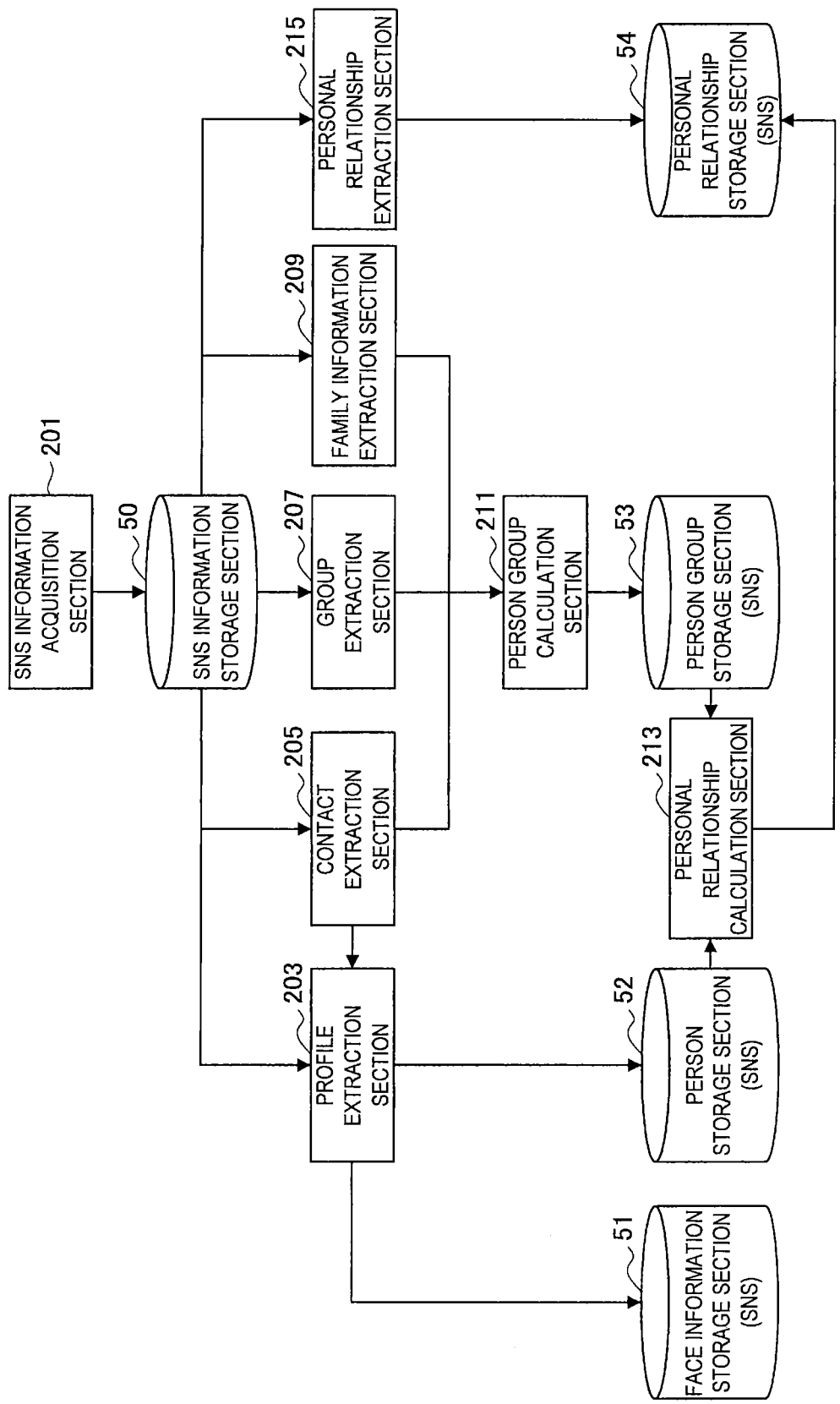
FIG. 28 is an explanatory diagram illustrating extraction of SNS information according to the embodiment.

Next, with reference to FIG. 28, there will be described extraction of SNS information used by the information processing apparatus 10b according to the second embodiment of the present disclosure. FIG. 28 is an explanatory diagram illustrating extraction of SNS information according to the embodiment.

For example, the SNS analysis information is generated using the functions of an SNS information acquisition section 201, a profile extraction section 203, a contact extraction section 205, a group extraction section 207, a family information extraction section 209, a person group calculation section 211, a personal relationship calculation section 213, and a personal relationship extraction section 215.

The SNS information acquisition section 201 can acquire information (SNS information) related to a user held by the SNS by using a Web API of the SNS. The SNS information acquisition section 201 can store the acquired SNS information in an SNS information storage section 50. Note that the SNS information acquisition section 201 may acquire the SNS information from a plurality of SNS's.

The profile extraction section 203 can extract a profile of the user out of the SNS information acquired by the SNS information acquisition section 201. The profile to be extracted here includes a photograph of the user and an attribute value of the user (sex, date of birth, grad school, company, and the like). The profile extraction section 203 can extract the photograph of the user from the SNS information and can store the photograph of the user in a face information storage section 51. Further, the profile extraction section 203 can extract the attribute value of the user from the SNS information and can store the attribute value of the user in a person storage section 52. Further, the profile extraction section 203 can also store contact information supplied by the contact extraction section 205 in the person storage section 52 as the person information.

The contact extraction section 205 can extract contact information out of the SNS information acquired by the SNS information acquisition section 201. The contact information can include a contact address (telephone number, e-mail address, or the like), an address book, and information of an account of the user, for example. The contact extraction section 205 can supply the profile extraction section 203 and the person group calculation section 211 with the extracted contact information.

The group extraction section 207 can extract group information out of the SNS information acquired by the SNS information acquisition section 201. The group information extracted here is group information registered by the user, for example. The group extraction section 207 can supply the person group calculation section 211 with the extracted group information.

The family information extraction section 209 can extract family information out of the SNS information acquired by the SNS information acquisition section 201. For example, in the case where the user registers information of a person who is a member of the family as the SNS information, the family information extraction section 209 can extract the registered family information. The family information extraction section 209 can supply the person group calculation section 211 with the extracted family information.

The person group calculation section 211 has a function of calculating a person group based on the contact information supplied from the contact extraction section 205, the group information supplied from the group extraction section 207, and the family information supplied from the family information extraction section 209. The person group calculation section 211 can store the generated person group information in a person group storage section 53.

The personal relationship calculation section 213 can generate, based on the person information stored in the person storage section 52 and the person group information stored in the person group storage section 53, personal relationship information that is based on the SNS information. For example, when detecting two persons are working at the same company by using the person information, the personal relationship calculation section 213 can set the personal relationship between the two persons as "colleagues". Further, for example, when detecting that two persons studied at the same high school and are the same age as each other by using the person information, the personal relationship calculation section 213 can set the personal relationship between the two persons as "classmates". The personal relationship calculation section 213 can store the generated personal relationship information in a personal relationship storage section 54.

The personal relationship extraction section 215 can extract personal relationship information included in the SNS information acquired by the SNS information acquisition section 201. The personal relationship extraction section 215 can store the extracted personal relationship information in the personal relationship storage section 54.

[2-4. Detailed Configuration Example]

Figure 29:
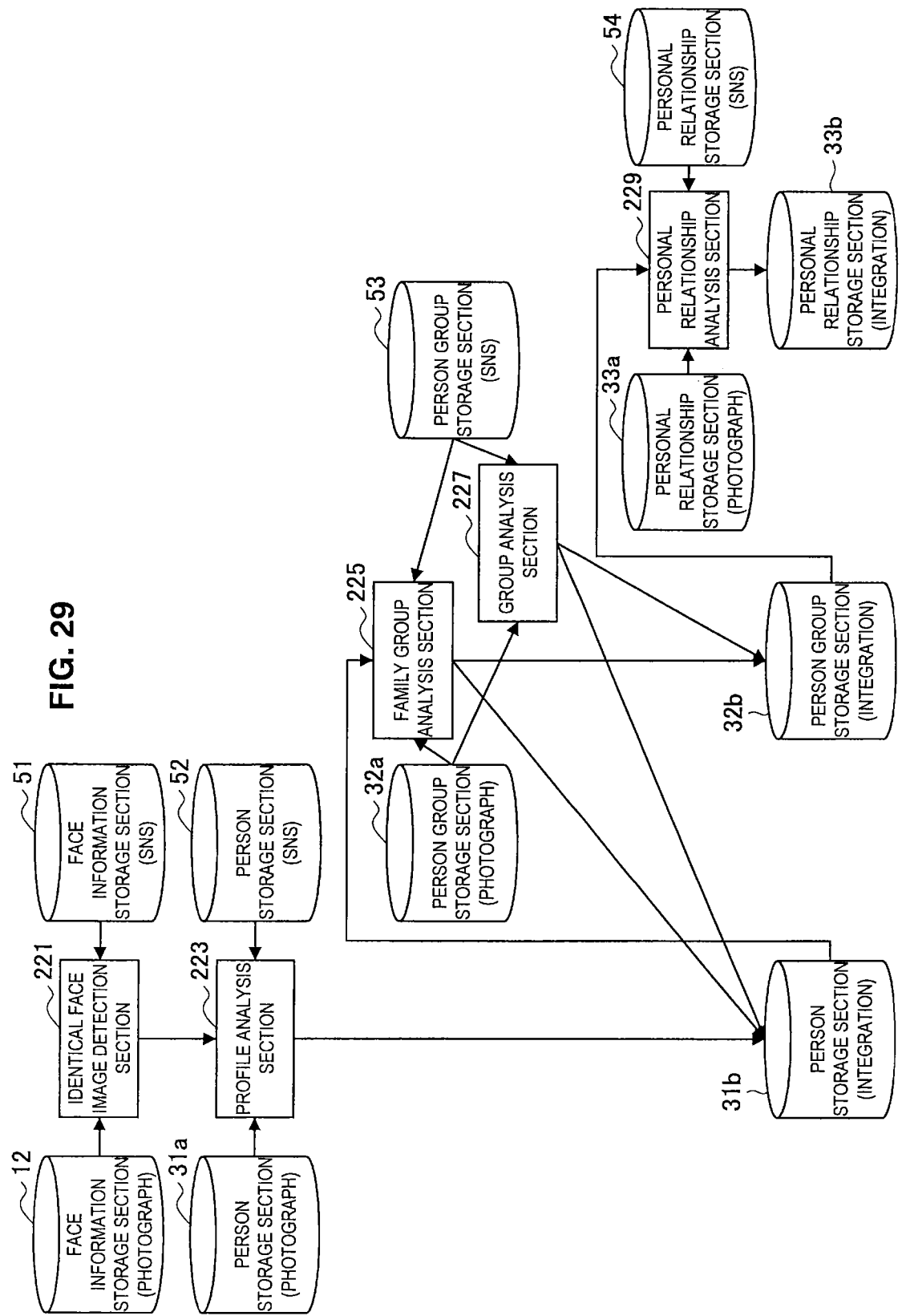
FIG. 29 is an explanatory diagram showing a detailed configuration example of the information processing apparatus according to the embodiment.

Next, with reference to FIG. 29, an example of a detailed configuration example of the information processing apparatus according to the second embodiment of the present disclosure will be described. FIG. 29 is an explanatory diagram showing a detailed configuration example of the information processing apparatus according to the embodiment.

In addition to the function of the person information generation section 20a described in the first embodiment, the person information generation section 20*b* can have a function of an identical face image detection section 221 and a function of a profile analysis section 223. Further, in addition to the function of the person group information generation section 30*a* described in the first embodiment, the person group information generation section 30*b* can have a function of a family group analysis section 225 and a function of a group analysis section 227. Further, in addition to the function of the personal relationship information generation section 40*a* described in the first embodiment, the personal relationship information generation section 40*b* can have a function of a personal relationship analysis section 229.

The identical face image detection section 221 has a function of detecting face images of the identical person by comparing a face image obtained by analyzing an image with a face image extracted from the SNS information. The identical face image detection section 221 can detect the face images of the identical person by using a degree of similarity between the face images, for example. The identical face image detection section 221 can supply the profile analysis section 223 with the information of the face images detected as the identical image.

The profile analysis section 223 has a function of determining whether persons are the identical person by analyzing the profiles of the persons who are detected as the identical person by the identical face image detection section 221. The profile analysis section 223 determines whether the persons are the identical person by comparing person information generated by analyzing an image with person information extracted from the SNS information. For example, the profile analysis section 223 may also compare attribute values such as sex and age with each other. When determining that the two detected pieces of person information are the person information on the identical person, the profile analysis section 223 can store, in the person storage section 31*b*, the person information generated by integrating the person information generated by analyzing the image with the person information extracted from the SNS information. Further, when there are no persons who are regarded as the identical person, the profile analysis section 223 can store the person information as it is in the person storage section 31*b*.

The family group analysis section 225 has a function of integrating groups which are determined to be the identical group by comparing information of a group regarded as a family group among the person group information generated by analyzing an image with information of a family group extracted from the SNS information. For example, the family group analysis section 225 can regard the groups having the completely correspondent person constituents as the identical group, and can integrate the pieces of person group information. Further, the family group analysis section 225 can regard the two groups as the identical group, one of the groups having person constituents that form a part of the person constituents of the other group, and can integrate the pieces of person group information. Alternatively, family group analysis section 225 can regard the two groups as the identical group, one of the groups having a part of person constituents that corresponds to a part of person constituents of the other group and the profiles of the rest of persons in one group being similar to the profiles of the rest of persons in the other group, and can integrate the pieces of person group information.

In this case, let us assume that it is known from the SNS information that a person is a member of a family of four, and the profiles of three persons are registered in the SNS information, for example. In this case, with the analysis of an image, if the family group of four persons including the person is extracted, it can be identified that the person who is a family member and not registered in the SNS information as the person included in the image. The family group analysis section 225 can store the generated person group information in the person group storage section 32*b*. Further, in the case of performing editing of the person information, the family group analysis section 225 can store the edited person information in the person storage section 31*b*.

The group analysis section 227 can execute the same integration processing as that performed by the family group analysis section 225 on the group classified into a group other than the family group. The group analysis section 227 can regard the groups having the completely correspondent person constituents as the identical group, and can integrate the pieces of person group information. Further, the group analysis section 227 can regard the two groups as the identical group, one of the groups having person constituents that form a part of the person constituents of the other group, and can integrate the pieces of person group information. Alternatively, the group analysis section 227 can regard the two groups as the identical group, one of the groups having a part of person constituents that corresponds to a part of person constituents of the other group and the profiles of the rest of persons in one group being similar to the profiles of the rest of persons in the other group, and can integrate the pieces of person group information.

The personal relationship analysis section 229 can integrate personal relationship information generated by analyzing an image with personal relationship information extracted from the SNS information. In this case, the personal relationship analysis section 229 may analyze the personal relationship based on the person group information generated by the family group analysis section 225 and the group analysis section 227. The personal relationship analysis section 229 can store the generated personal relationship information in a personal relationship storage section 33*b*.

Heretofore, an example of the functions of the information processing apparatus 10*b* according to the present embodiment has been shown. Each of the above structural elements may be configured using general-purpose members or circuits, or may be configured using hardware specialized for the function of each structural element. Further, the function of each structural element may be realized by reading out, by an arithmetic unit such as a CPU (Central Processing Unit), a control program from the storage medium such as a ROM (Read Only Memory) or a RAM (Random Access Memory) that stores the control program in which procedures for realizing those functions are written, and by interpreting and executing the program. Therefore, the configuration to be used can be changed appropriately in accordance with the technical level each time when the embodiment is carried out.

Note that there may be produced a computer program for realizing each function of the information processing apparatus 10*b* according to the present embodiment as described above, and the computer program can be implemented in a personal computer or the like. Further, there can also be provided a computer-readable recording medium having the computer program stored therein. Examples of the recording medium include a magnetic disk, an optical disc, a magneto-optical disk, and a flash memory. Further, the computer program may be distributed via a network, without using the recording medium, for example.

It should be understood by those skilled in the art that various modifications, combinations, sub-combinations and alterations may occur depending on design requirements and other factors insofar as they are within the scope of the appended claims or the equivalents thereof.

Note that in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

Additionally, the present technology may also be configured as below.

(1) An information processing apparatus including:
a face image acquisition section which acquires face images extracted from images which are classified into an identical time cluster by performing time clustering; and
a person information generation section which classifies the face images for each time cluster, and generates person information in which persons regarded as an identical person are identified based on the face images which are classified.

(2) The information processing apparatus according to (1),
wherein the person information generation section identifies the persons regarded as an identical person based on a degree of similarity between the face images and face feature quantities indicating predetermined attribute values of the face images.

(3) The information processing apparatus according to (2),
wherein the person information generation section compares the face feature quantities of the face clusters with each other, the face clusters being obtained by performing clustering on the face images based on the degree of similarity, and integrates the face clusters which are not included in an identical image, among the face clusters in which a difference between the face feature quantities is equal to or less than a predetermined threshold.

(4) The information processing apparatus according to (2) or (3),
wherein the face feature quantities include age attribute values based on the face images, and
wherein the person information generation section estimates birth years of respective persons based on the age attribute values and capturing dates/times of the face images, and, by using information of the estimated birth years, integrates persons regarded as an identical person among the persons further identified for each time cluster.

(5) The information processing apparatus according to any one of (1) to (4), further including
a person group information generation section which classifies persons identified by the person information generation section for each time cluster based on images which are classified into the identical time cluster, and generates a person group.

(6) The information processing apparatus according to (5),
wherein the person group information generation section integrates person groups identified for each time cluster based on person constituents included in the person group.

(7) The information processing apparatus according to (6), further including
a personal relationship information generation section which generates personal relationship information between persons identified by the person information generation section based on person constituents included in a person group generated by the person group information generation section.

(8) The information processing apparatus according to any one of (1) to (7),
wherein the person information generation section generates the person information further based on information extracted from a social network service.

(9) The information processing apparatus according to (8),
wherein the person information generation section determines whether persons are an identical person based on a degree of similarity between a face image extracted from a social network service and a face image acquired by the face image acquisition section, and a degree of similarity between an attribute value of a person extracted from a social network service and an attribute value of a person obtained by analyzing the face image.

(10) The information processing apparatus according to (8) or (9),
wherein the person group information generation section generates the person group information further based on information extracted from the social network service.

(11) The information processing apparatus according to (10),
wherein the person group information generation section integrates pieces of person group information by comparing person constituents included in person group information extracted from the social network service with person constituents included in person group information generated based on the image, and by identifying an identical person group.

(12) An information processing method including:
acquiring face images extracted from images which are classified into an identical time cluster by performing time clustering; and
classifying the face images for each time cluster, and generating person information in which persons regarded as an identical person are identified based on the face images which are classified.

(13) A program for causing a computer to function as an information processing apparatus including
a face image acquisition section which acquires face images extracted from images which are classified into an identical time cluster by performing time clustering, and
a person information generation section which classifies the face images for each time cluster, and generates person information in which persons regarded as an identical person are identified based on the face images which are classified.

The present disclosure contains subject matter related to that disclosed in Japanese Priority Patent Application JP 2011-130963 filed in the Japan Patent Office on Jun. 13, 2011, the entire content of which is hereby incorporated by reference.

What is claimed is:
1. An information processing apparatus comprising:
a central processing unit (CPU) operable to:
classify a plurality of captured images into a plurality of identical time clusters, wherein an identical time cluster of the plurality of identical time clusters comprises a group of images which are clustered on the basis of date and/or time at which each of the images are captured;
extract face regions from the group of images that belong to the identical time cluster of the plurality of identical time clusters;
classify the extracted face regions into a plurality of face clusters, wherein a face cluster of the plurality of face clusters comprises face regions of an identical person;
generate person information in which persons regarded as the identical person are identified based on the face regions of the identical person which are classified in the face cluster; and
integrate a first face cluster of the plurality of face clusters with a second face cluster of the plurality of face clusters, which are not included in an identical image, based on average face feature quantities of the first face cluster and the second face cluster.

2. The information processing apparatus according to claim 1, wherein the CPU is further operable to identify the persons regarded as the identical person based on a degree of similarity between the extracted face regions and face feature quantities indicating predetermined attribute values of the extracted face regions.

3. The information processing apparatus according to claim 2, wherein the CPU is further operable to
compare the average face feature quantities of the plurality of face clusters with each other, the plurality of face clusters being obtained by performing clustering on the extracted face regions based on the degree of similarity, and
integrate a set of face clusters of the plurality of face clusters which is not included in the identical image, among the face clusters in which a difference between the average face feature quantities is equal to or less than a predetermined threshold.

4. The information processing apparatus according to claim 2,
wherein the face feature quantities include age attribute values based on the extracted face regions, and
wherein the CPU is further operable to:
estimate birth years of respective persons based on the age attribute values and capturing dates/times of the extracted face regions; and
integrate the persons regarded as the identical person among the persons further identified for each of the plurality of time clusters by using information of the estimated birth years.

5. The information processing apparatus according to claim 1, wherein the CPU is further operable to:
classify the persons for each of the plurality of time clusters based on the group of images which are classified into the plurality of identical time clusters; and
generate a person group for each of the plurality of time clusters.

6. The information processing apparatus according to claim 5, wherein the CPU is further operable to integrate person groups identified for each of the plurality of time clusters based on person constituents included in the person group.

7. The information processing apparatus according to claim 6, wherein the CPU is operable to generate personal relationship information between the persons identified based on the person constituents included in the person group.

8. The information processing apparatus according to claim 1, wherein the CPU is further operable to generate the person information based on information extracted from a social network service.

9. The information processing apparatus according to claim 1, wherein the CPU is further operable to determine whether the persons are the identical person based on a degree of similarity between a face region extracted from a social network service and the face regions extracted from the group of images, and a degree of similarity between an attribute value of a person extracted from the social network service and an attribute value of a person obtained by analyzing the face regions extracted from the group of images.

10. The information processing apparatus according to claim 9, wherein the CPU is further operable to generate person group information based on information extracted from the social network service.

11. The information processing apparatus according to claim 10, wherein the CPU is further operable to integrate pieces of the person group information by comparing person constituents included in the person group information generated based on the information extracted from the social network service with person constituents included in the person group information generated based on the plurality of captured images, and by identifying an identical person group.

12. An information processing method comprising:
classifying a plurality of captured images into a plurality of identical time clusters, wherein an identical time cluster of the plurality of identical time clusters comprises a group of images which are clustered on the basis of date and/or time at which each of the images are captured;
extracting face regions from the group of images that belong to the identical time cluster of the plurality of identical time clusters;
classifying the extracted face regions into a plurality of face clusters, wherein a face cluster of the plurality of face clusters comprises the face regions of an identical person;
generating person information in which persons regarded as the identical person are identified based on the face regions of the identical person which are classified in the face cluster; and
integrating a first face cluster of the plurality of face clusters with a second face cluster of the plurality of face clusters, which are not included in an identical image, based on average face feature quantities of the first face cluster and the second face cluster.

13. A non-transitory computer-readable storage medium, having stored thereon, a set of computer-executable instructions for causing a computer to perform a method comprising:
classifying a plurality of captured images into a plurality of identical time clusters, wherein an identical time cluster of the plurality of identical time clusters comprises a group of images which are clustered on the basis of date and/or time at which each of the images are captured;
extracting face regions from the group of images that belong to the identical time cluster of the plurality of identical time clusters;
classifying the extracted face regions extracted from the identical time cluster into a plurality of face clusters, wherein a face cluster of the plurality of face clusters comprises the face regions of an identical person;
generating person information in which persons regarded as the identical person are identified based on the face regions of the identical person which are classified in the face cluster; and
integrating a first face cluster of the plurality of face clusters with a second face cluster of the plurality of face clusters, which are not included in an identical image, based on average face feature quantities of the first face cluster and the second face cluster.

* * * * *